(12) United States Patent
Beare

(10) Patent No.: US 11,461,143 B2
(45) Date of Patent: Oct. 4, 2022

(54) COMPUTING RESOURCE ALLOCATION WITH SUBGRAPH ISOMORPHISM

(71) Applicant: Megh Computing, Inc., Hillsboro, OR (US)

(72) Inventor: Jonathan Beare, Hillsboro, OR (US)

(73) Assignee: MEGH COMPUTING, INC., Hillsboro, OR (US)

( * ) Notice: Subject to any disclaimer, the term of this patent is extended or adjusted under 35 U.S.C. 154(b) by 205 days.

(21) Appl. No.: 17/014,925

(22) Filed: Sep. 8, 2020

(65) Prior Publication Data

US 2022/0075660 A1  Mar. 10, 2022

(51) Int. Cl.
*G06F 9/50* (2006.01)
*G06N 7/00* (2006.01)
*G06F 9/30* (2018.01)
*G06F 9/38* (2018.01)

(52) U.S. Cl.
CPC ........ *G06F 9/5044* (2013.01); *G06F 9/30079* (2013.01); *G06F 9/3877* (2013.01); *G06N 7/005* (2013.01)

(58) Field of Classification Search
CPC .......... G06F 9/505; G06N 7/005; H04L 45/14
See application file for complete search history.

(56) References Cited

U.S. PATENT DOCUMENTS

| 5,887,174 | A  | * | 3/1999 | Simons | G06F 8/445 712/216 |
| 7,167,850 | B2 | * | 1/2007 | Stanfill | G06F 9/4494 709/200 |
| 2016/0217007 | A1 | * | 7/2016 | Ueno | G06F 9/5083 |
| 2018/0276278 | A1 | * | 9/2018 | Cagan | G06N 20/00 |
| 2020/0202246 | A1 | * | 6/2020 | Lin | G06F 9/5061 |
| 2020/0286146 | A1 | * | 9/2020 | Song | G06N 5/02 |
| 2021/0073285 | A1 | * | 3/2021 | Hunter | G06F 8/33 |

* cited by examiner

*Primary Examiner* — Jacob Petranek
(74) *Attorney, Agent, or Firm* — Alleman Hall Creasman & Tuttle LLP

(57) ABSTRACT

A computing system is provided, including a processor configured to generate a directed weighted graph indicating a plurality of functions configured to be executed on a plurality of communicatively connected processing devices. For each of a plurality of pairs of the functions, the processor may determine a shortest path between the pair of functions. The processor may generate a second graph indicating the plurality of pairs of functions connected by the shortest paths. The processor may receive a pipeline directed acyclic graph (DAG) specifying a data pipeline of a plurality of processing stages. The processor may determine a subgraph isomorphism between the pipeline DAG and the second graph. The processor may convey, to one or more processing devices of the plurality of processing devices, instructions to execute the plurality of processing stages as specified by the subgraph isomorphism.

20 Claims, 10 Drawing Sheets

COMPUTING RESOURCE ALLOCATION WITH SUBGRAPH ISOMORPHISM

BACKGROUND

In applications such as machine learning and video processing, hardware accelerators designed to perform specialized computing tasks are frequently used. These hardware accelerators are often distributed between multiple physical computing devices. When users run code that uses hardware accelerators, data may be transmitted between the computing devices through an inefficient path. Thus, processing the code may be more time-consuming and expensive than would be desirable.

SUMMARY

According to one aspect of the present disclosure, a computing system is provided, including a processor configured to generate a first computing resource graph. The first computing resource graph may be a directed weighted graph indicating a plurality of functions configured to be executed on a plurality of communicatively connected processing devices. For a plurality of pairs of the functions indicated in the first computing resource graph, wherein each pair includes a first function with a first output type and a second function with a second input type that matches the first output type, the processor may be further configured to determine a shortest path including one or more first-graph edges on the first computing resource graph between the first function and the second function. The processor may be further configured to generate a second computing resource graph indicating the plurality of pairs of functions connected by a plurality of second-graph edges. Each second-graph edge may be the shortest path for the pair of functions connected by that second-graph edge. The processor may be further configured to receive a pipeline directed acyclic graph (DAG) specifying a data pipeline of a plurality of processing stages configured to be executed with corresponding functions of the plurality of functions. The processor may be further configured to determine a subgraph isomorphism between the pipeline DAG and the second computing resource graph. The processor may be further configured to convey, to one or more processing devices of the plurality of processing devices, instructions to execute the plurality of processing stages with the plurality of functions as specified by the subgraph isomorphism.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
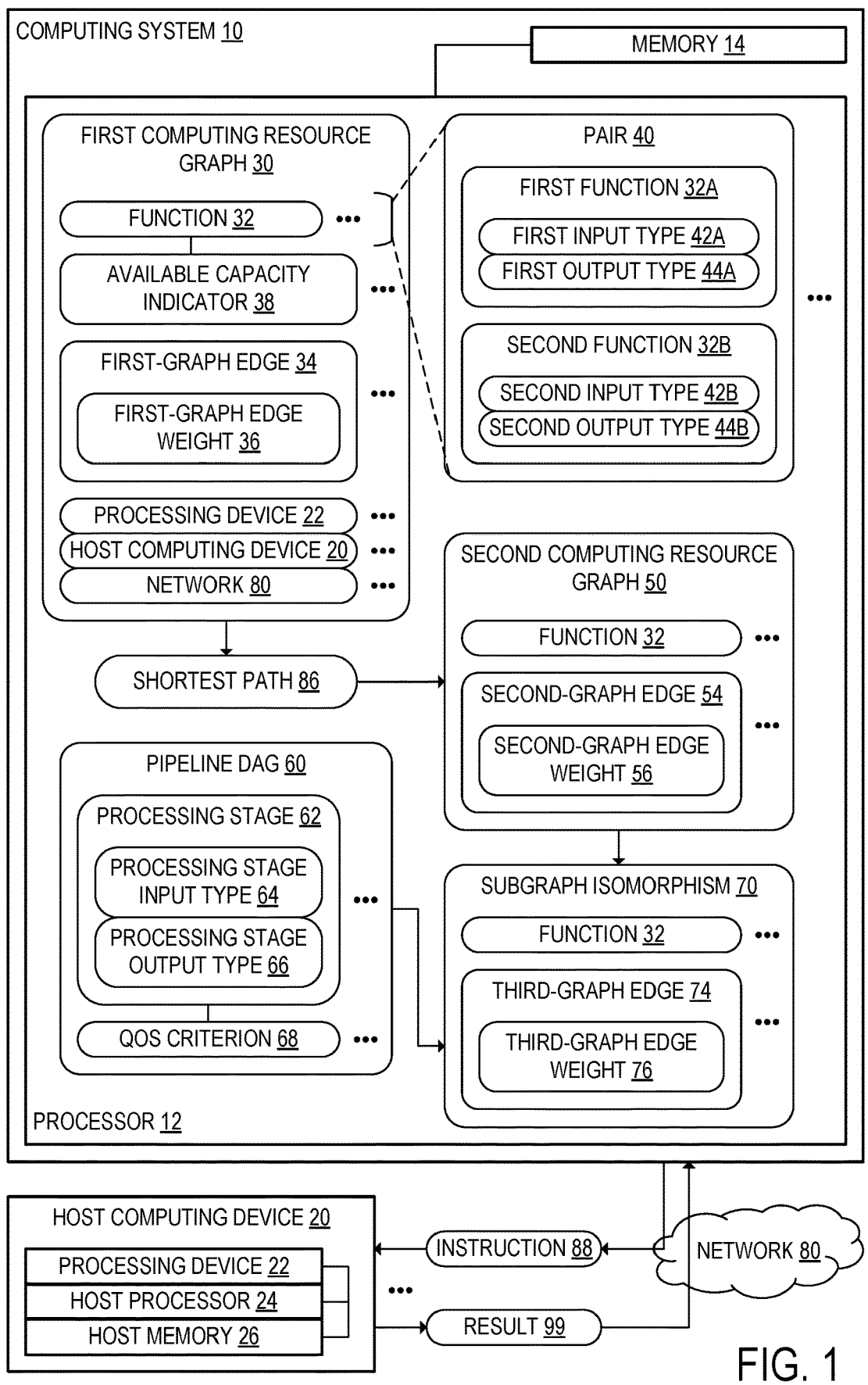
FIG. 1 schematically shows a computing system and a host computing device, according to one example embodiment.

In order to address the issues discussed above, a computing system 10 is provided, as schematically shown in the example of FIG. 1. The computing system 10 may include a processor 12 and memory 14, each of which may take the form of one or more physical components of the computing system 10. The functionality of the processor 12 and the memory 14 may, in some examples, be divided between a plurality of physical computing devices that are configured to communicate with each other to form the computing system 10. In addition, the computing system 10 may be configured to communicate with one or more host computing devices 20, which may, for example, include one or more server computing devices located in a data center. The computing system 10 may communicate with the one or more host computing devices 20 over a network 80, which may be a local- or wide-area network. For example, the computing system 10 may be physically connected to a host computing device 20 by an Ethernet connection.

Each host computing device 20 may include a host processor 24 and host memory 26. In addition, the host computing device 20 may include one or more processing devices 22. The one or more processing devices 22 may include one or more specialized hardware accelerators such as a graphical processing unit (GPU), an application-specific integrated circuit (ASIC), or a field-programmable gate array (FPGA). Additionally or alternatively, the one or more processing devices 22 may include at least one general-purpose central processing unit (CPU). The plurality of processing devices 22 may be used to instantiate a data pipeline that includes a plurality of processing stages, as discussed in further detail below.

The processor 12 of the computing system 10 may be configured to generate a first computing resource graph 30. The first computing resource graph 30 may indicate a plurality of functions 32 configured to be executed on the plurality of communicatively connected processing devices 22. The first computing resource graph 30 may be a directed weighted graph including a plurality of first-graph edges 34 that have respective first-graph edge weights 36. In addition to the plurality of functions 32, the first computing resource graph 30 may further indicate one or more physical devices that are directly or indirectly connected to the plurality of functions 32 by the plurality of first-graph edges 34. Each physical device of the one or more physical devices may be a network 80, a host computing device 20, or a processing device 22 of the one or more processing devices 22. Thus, the first computing resource graph 30 may include both the plurality of functions 32 and the physical devices on which the functions 32 may be executed.

Figure 2:
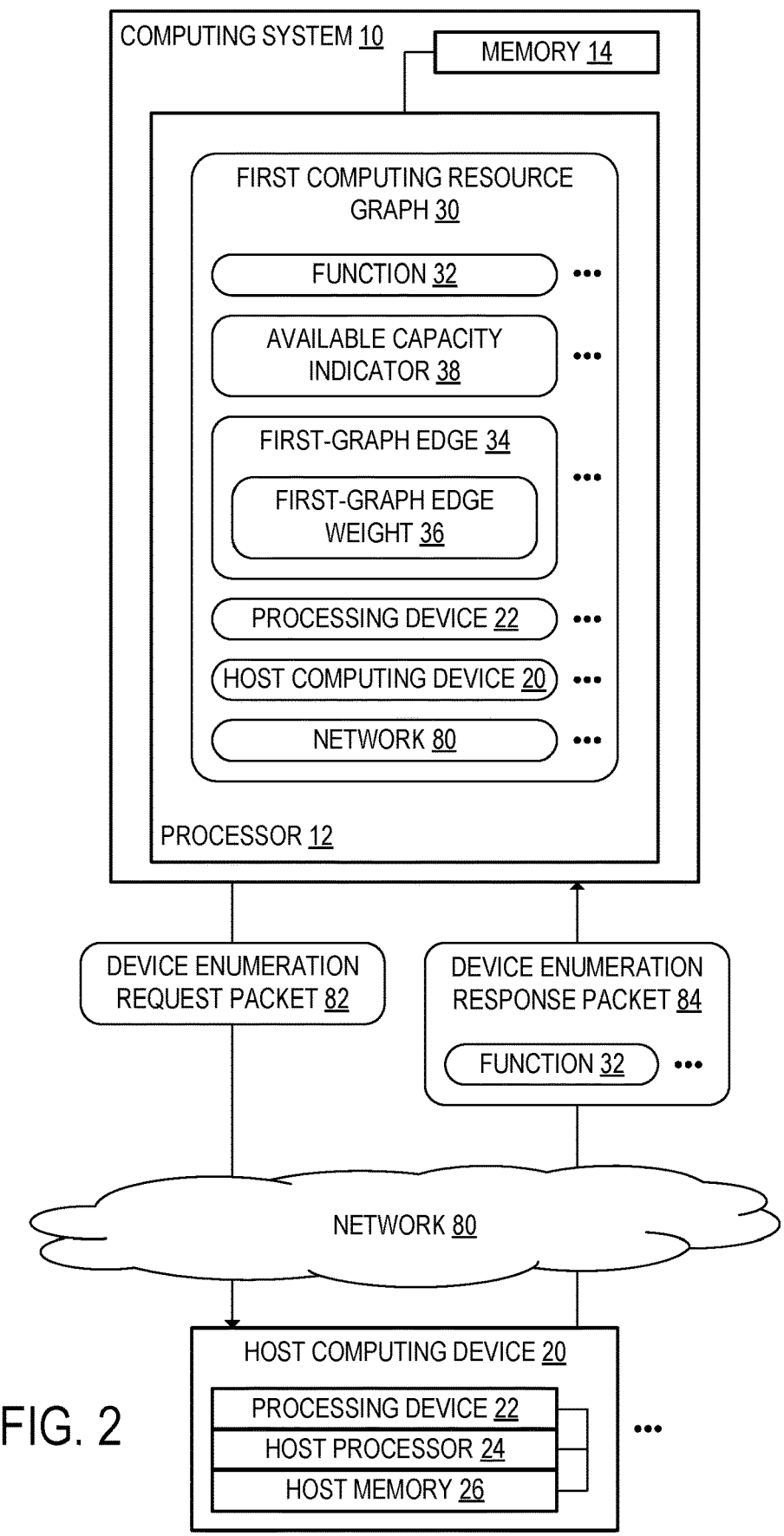
FIG. 2 schematically shows the computing system and the host computing system when the processor of the computing system generates a first computing resource graph, according to the embodiment of FIG. 1.

The processor 12 may be configured to generate the first computing resource graph 30 at least in part by transmitting a respective plurality of device enumeration request packets 82 to the plurality of processing devices 22, as shown in the example of FIG. 2. Subsequently to transmitting the device enumeration request packets 82, generating the first computing resource graph 30 may further include receiving a respective plurality of device enumeration response packets 84 from the plurality of processing devices 22. The plurality of enumeration response packets 84 may indicate the plurality of functions 32 configured to be executed at the plurality of processing devices 22. The plurality of device enumeration response packets 84 may further indicate the plurality of physical devices connected to the plurality of functions 32. The plurality of device enumeration response packets 84 may additionally or alternatively indicate, for one or more of the processing devices 22, a topology of the one or more functions 32 configured to be executed on that processing device 22. Thus, the processor 12 of the computing system 10 may be configured to receive information about the layout of the functions 32 and the physical devices from which the processor 12 may be further configured to generate the first computing resource graph 30.

When the processor 12 generates the first computing resource graph 30, the processor 12 may be further configured to assign the first-graph edge weights 36 to the first-graph edges 34 based at least in part on, for each endpoint of each first-graph edge 34, whether that endpoint is a function 32, a processing device 22, a host computing device 20, or a network 80. The first-graph edge weights 36 may, for example, be assigned to the first-graph edges 34 according to a predetermined mapping of a first endpoint type and a second endpoint type to a first-graph edge weight 36. Each first-graph edge weight 36 may be an estimate of a latency associated with traversing the connection that edge represents when instantiating a data pipeline.

Figure 3A:
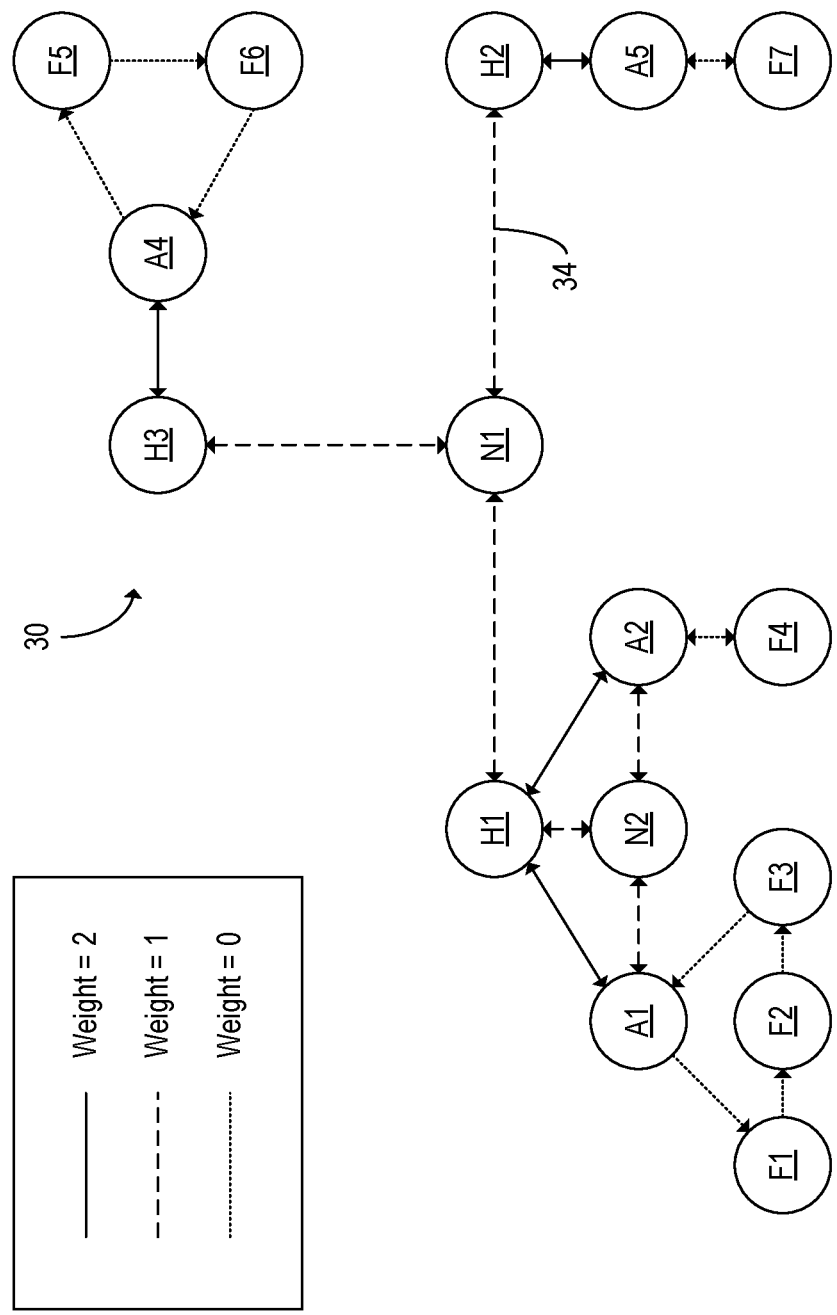
FIG. 3A shows an example of a first computing resource graph, according to the embodiment of FIG. 1.

FIG. 3A shows an example first computing resource graph 30. The first computing resource graph 30 of FIG. 3A includes two networks N1 and N2; three host computing devices H1, H2, and H3; five hardware accelerators A1, A2, A3, A4, and A5; and seven functions F1, F2, F3, F4, F5, F6, and F7. In the example of FIG. 3A, the computing system 10 may be one of the host computing devices H1, H2, or H3. The hardware accelerators A1, A2, A3, A4, and A5 may be the plurality of processing devices 22. In the example of FIG. 3A, the first computing resource graph 30 is weighted such that first-graph edges 34 between host computing devices and hardware accelerators have weights of 2, first-graph edges 34 between host computing devices and networks have weights of 1, and other first-graph edges 34 have weights of 0.

Returning to FIG. 1, the processor 12 may be further configured to determine a plurality of shortest paths 86 between a respective plurality of pairs 40 of the functions 32 indicated in the first computing resource graph 30. As shown in FIG. 1, each pair 40 may include a first function 32A and a second function 32B. The first function 32A may have a first input type 42A and a first output type 44A, and the second function 32B may have a second input type 42B and a second output type 44B. The processor 12 may be configured to determine the shortest path between the first function 32A and the second function 32B when the second input type 42B of the second function 32B matches the first output type 44A of the first function 32A. Thus, an output of the first function 32A may be usable as an input for the second function 32B. The shortest path 86 may be a weighted shortest path that has a lowest total edge weight among paths on the first computing resource graph 30 from the first function 32A to the second function 32B. When the processor 12 determines the shortest path 86 between the first function 32A and the second function 32B, the processor 12 may use a shortest-path algorithm such as Dijkstra's algorithm, the Bellman-Ford algorithm, topological sorting, the Floyd-Warshall algorithm, Johnson's algorithm, or some other shortest path algorithm.

The first computing resource graph 30 may include a respective plurality of available capacity indicators 38 for the plurality of functions 32. Each available capacity indicator 38 may, for example, be an indicator of whether that function 32 is currently in use as part of another data pipeline. In some examples, the available capacity indicator 38 for a function 32 may indicate a level of throughput available for that function 32. The processor 12 may be configured to use the available capacity indicators 38 of the plurality of functions 32 when determining the shortest paths 86. For each pair 40 of the plurality of pairs 40 of functions 32, the processor 12 may be configured to determine the shortest path 86 between the first function 32A and the second function 32B of the pair 40 subsequently to determining that respective available capacity indicators 38 for the first function 32A and the second function 32B indicate that the first function 32A and the second function 32B both have available processing capacity. The processor 12 may be further configured to select the shortest path 86 between the first function 32A and the second function 32B such that the shortest path 86 does not pass through any function 32 with an available capacity indicator 38 that marks that function 32 as unavailable. For example, the processor 12 may be configured to assign an infinite first-graph edge weight 36 to any first-graph edge 34 that points to an unavailable function 32. Thus, the processor 12 may be configured to exclude unavailable functions 32 from shortest path computations.

The processor 12 may be further configured to generate a second computing resource graph 50 indicating the plurality of pairs 40 of functions 32 connected by a plurality of second-graph edges 54. Each second-graph edge 54 may be the shortest path 86 for the pair 40 of functions 32A and 32B connected by that second-graph edge 54. Thus, the second computing resource graph 50 may be a graph of the shortest paths 86 between all the pairs 40 of functions 32A and 32B that have compatible input types and output types. For each pair 40 of functions 32A and 32B connected by a respective second-graph edge 54 as indicated in the second computing resource graph 50, the second-graph edge 54 may have a second-graph edge weight 56 equal to a total first-graph edge weight of the shortest path 86 for the pair 40 as indicated in the first computing resource graph 30. The processor 12 may be configured to sum the one or more first-graph edge weights 36 included in the shortest path 86 between the first function 32A and the second function 32B to obtain the second-graph edge weight 56 for the second-graph edge 54 between the first function 32A and the second function 32B.

Figure 3B:
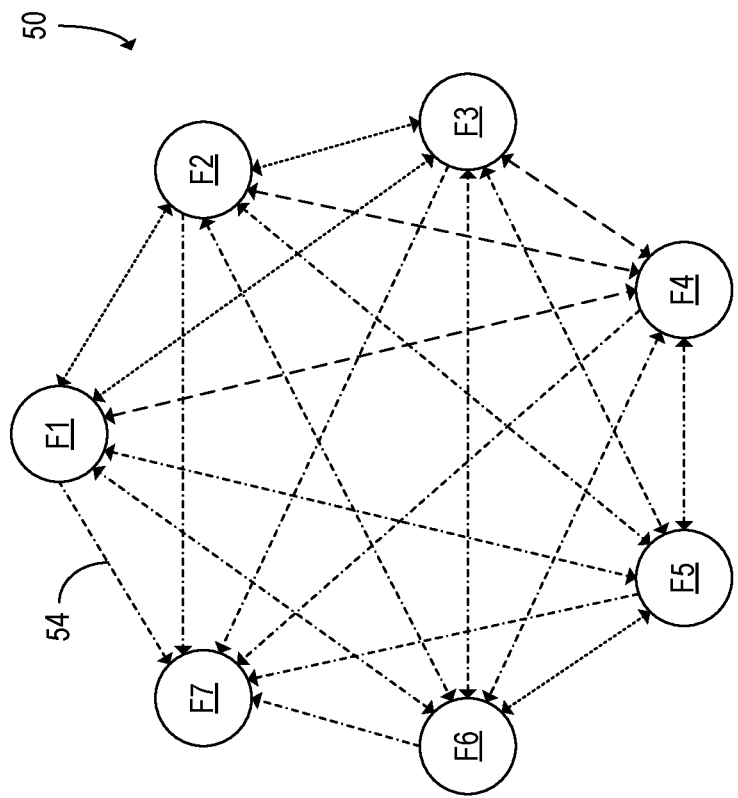
FIG. 3B shows an example of a second computing resource graph generated from the first computing resource graph of FIG. 3A.

FIG. 3B shows an example second computing resource graph 50 generated from the first computing resource graph 30 of FIG. 3A. In the example of FIG. 3B, each of the functions F1, F2, F3, F4, F5, and F6 has a respective output type that matches the input type of each of the functions F1, F2, F3, F4, F5, F6, and F7. In contrast, F7 has a different output type that does not match the respective input types of F1, F2, F3, F4, F5, and F6. Each second-graph edge 54 shown in FIG. 3B has a second-graph edge weight 56 equal to the total first-graph edge weight of the shortest path 86 between the functions connected by that second-graph edge 54. In the example of FIG. 3B, each second-graph edge weight 56 is equal to 0, 2, or 6.

Figure 4:
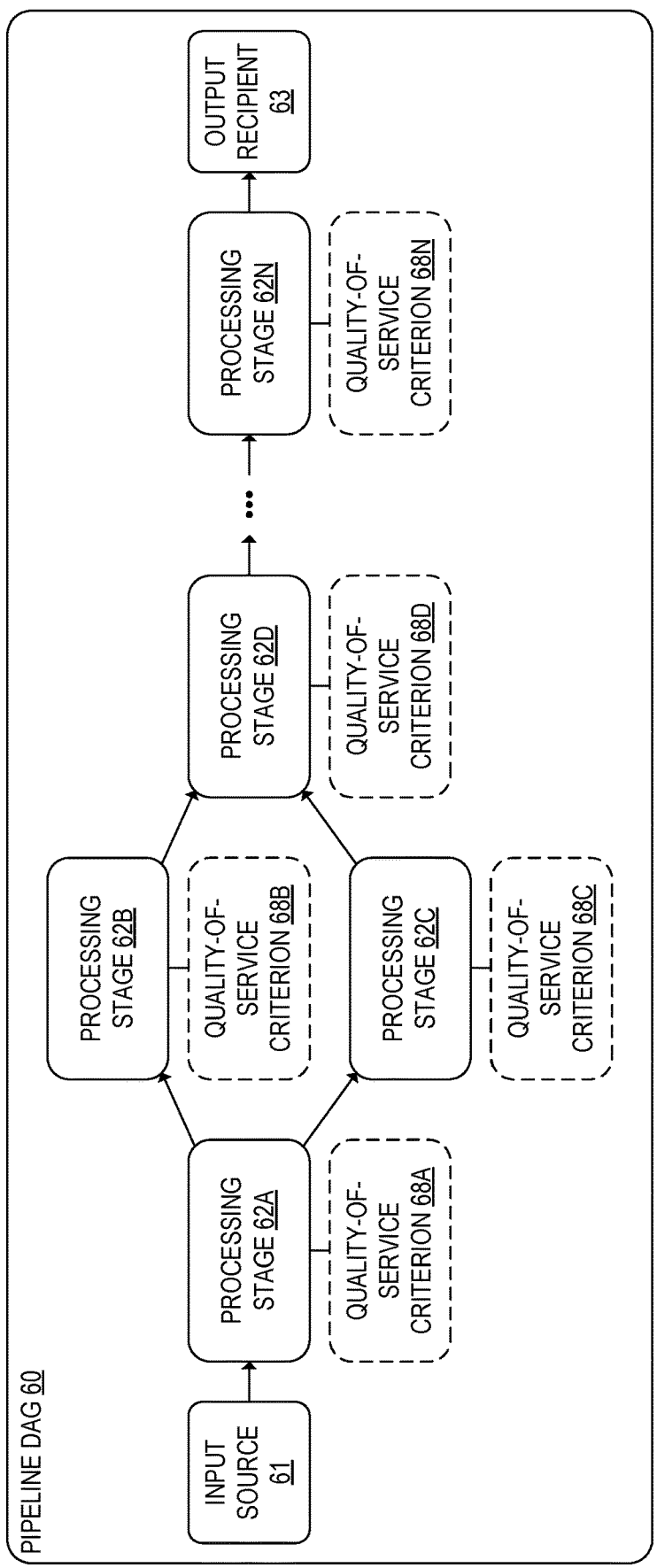
FIG. 4 shows an example pipeline directed acyclic graph (DAG), according to the embodiment of FIG. 1.

Returning to FIG. 1, the processor 12 may be further configured to receive a pipeline directed acyclic graph (DAG) 60 specifying a data pipeline of a plurality of processing stages 62 configured to be executed with corresponding functions 32 of the plurality of functions 32. The processing stages 62 may each include one or more code instructions. Each processing stage 62 of the plurality of processing stages 62 may have a respective processing stage input type 64 and a respective processing stage output type 66, which may be specified in the pipeline DAG 60. An example pipeline DAG 60 is shown in FIG. 4. The example pipeline DAG 60 of FIG. 4 specifies an input source 61 and an output recipient 63 of the data pipeline, each of which may be the computing system 10 or some other computing device. The pipeline DAG 60 further includes a plurality of processing stages 62A, 62B, 62C, 62D, . . . , 62N between the input source 61 and the output recipient 63. As shown in FIG. 4, the pipeline DAG 60 may include one or more branches. In some examples, the pipeline DAG 60 may specify a plurality of input sources 61 and/or a plurality of output recipients 63.

The pipeline DAG 60 may further specify a quality-of-service (QoS) criterion 68 for each processing stage 62 of the plurality of processing stages 62. In the example of FIG. 4, the processing stages 62A, 62B, 62C, 62D, . . . , 62N have respective QoS criteria 68A, 68B, 68C, 68D, . . . , 68N. The QoS criterion 68 for a processing stage 62 may, for example, indicate a minimum throughput or a maximum latency for that processing stage 62. The processor 12 may be further configured to use the QoS criteria 68 of the processing stages 62 when determining whether the functions 32 included in the first computing resource graph 30 have available processing capacity. For each function 32 included in the plurality of pairs 40 of functions 32, the processor 12 may be further configured to determine that that function 32 has available processing capacity when the processing capacity indication 38 for that function 32 satisfies the quality-of-service criterion 68 for the processing stage 62 configured to be executed with that function 32.

As shown in FIG. 1, the processor 12 may be further configured to determine a subgraph isomorphism 70 between the pipeline DAG 60 and the second computing resource graph 50. The subgraph isomorphism 70 may be a portion of the second computing resource graph 50 that is topologically isomorphic to the pipeline DAG 60. Accordingly, the subgraph isomorphism 70 may include a plurality of third-graph edges 74 with a respective plurality of third-graph edge weights 76 that are equal to the second-graph edge weights 56 of the corresponding second-graph edges 54 of the second computing resource graph 50. The subgraph isomorphism 70 may be determined using a subgraph isomorphism algorithm such as Ullman's algorithm, VF2, QuickSI, GraphQL, GADDI, SPath, or some other subgraph isomorphism algorithm.

In some examples, the subgraph isomorphism 70 may be one of a plurality of subgraph isomorphisms 70 between the pipeline DAG 60 and the second computing resource graph 50. In such examples, the subgraph isomorphism 70 selected by the processor 12 may be a subgraph isomorphism 70 with a lowest total second-graph edge weight among the plurality of subgraph isomorphisms 70. The total second-graph edge weight for a subgraph isomorphism 70 may be a sum of the second-graph edge weights 56 of the plurality of second-graph edges 54 included in the second computing resource graph 50. Thus, in examples in which the second-graph edge weights 56 are latency estimates, the subgraph isomorphism 70 with the lowest total second-graph edge weight may be the subgraph isomorphism 70 with the lowest estimated latency among the plurality of subgraph isomorphisms 70.

The processor 12 may be further configured to convey, to one or more processing devices 22 of the plurality of processing devices 22, instructions 88 to execute the plurality of processing stages 62 with the plurality of functions 32 as specified by the subgraph isomorphism 70. These instructions 88 may be conveyed to the one or more host computing devices 20 over the network 80. The instructions 88 may, for example, take the form of a plurality of input packets that include routing information and payload information. In this example, when the one or more processing devices 22 receive the plurality of input packets, the one or more processing devices 22 may be configured to implement the plurality of functions 32 specified in the processing stages 62 of the pipeline DAG 60. It will be appreciated that following completion of the host computing device 20 processing of the instruction 88, the host computing device 20 may be configured to transmit a result 99 to the computing system 10, which may be an acknowledgment of completion of processing, analytic data associated with the processing, or a substantive result of the processing such as a processed image, etc.

In examples in which each processing stage 62 has a respective processing stage input type 64 and a respective processing stage output type 66 specified in the pipeline DAG 60, the processor 12 may be configured to output the instructions 88 such that, for each processing stage 62, the instructions 88 to execute that processing stage 62 are conveyed to a processing device 22 of the plurality of processing devices 22 that is configured to execute a corresponding function 32 with the processing stage input type 64 and the processing stage output type 66 of the processing stage 62. Accordingly, each instruction 88 to execute a processing stage 62 may be transmitted to a processing device 22 that is compatible with the function 32 indicated by that processing stage 62.

In examples in which the first computing resource graph 30 includes respective available capacity indicators 38 for the plurality of functions 32, the processor 12 may be further configured to update the respective available capacity indicators 38 of the one or more functions 32 specified by the subgraph isomorphism 70. The available capacity indicators 38 may be updated to account for the use of processing capacity to instantiate the data pipeline specified in the pipeline DAG 60. The processor 12 may, for example, be configured to update the available capacity indicators 38 subsequently to conveying the instructions 88 to execute the plurality of processing stages 62 to the plurality of processing devices 22. Alternatively, the processor 12 may be configured to update the available capacity indicators 38 after generating the subgraph isomorphism 70 but prior to conveying the instructions 88.

Figure 5:
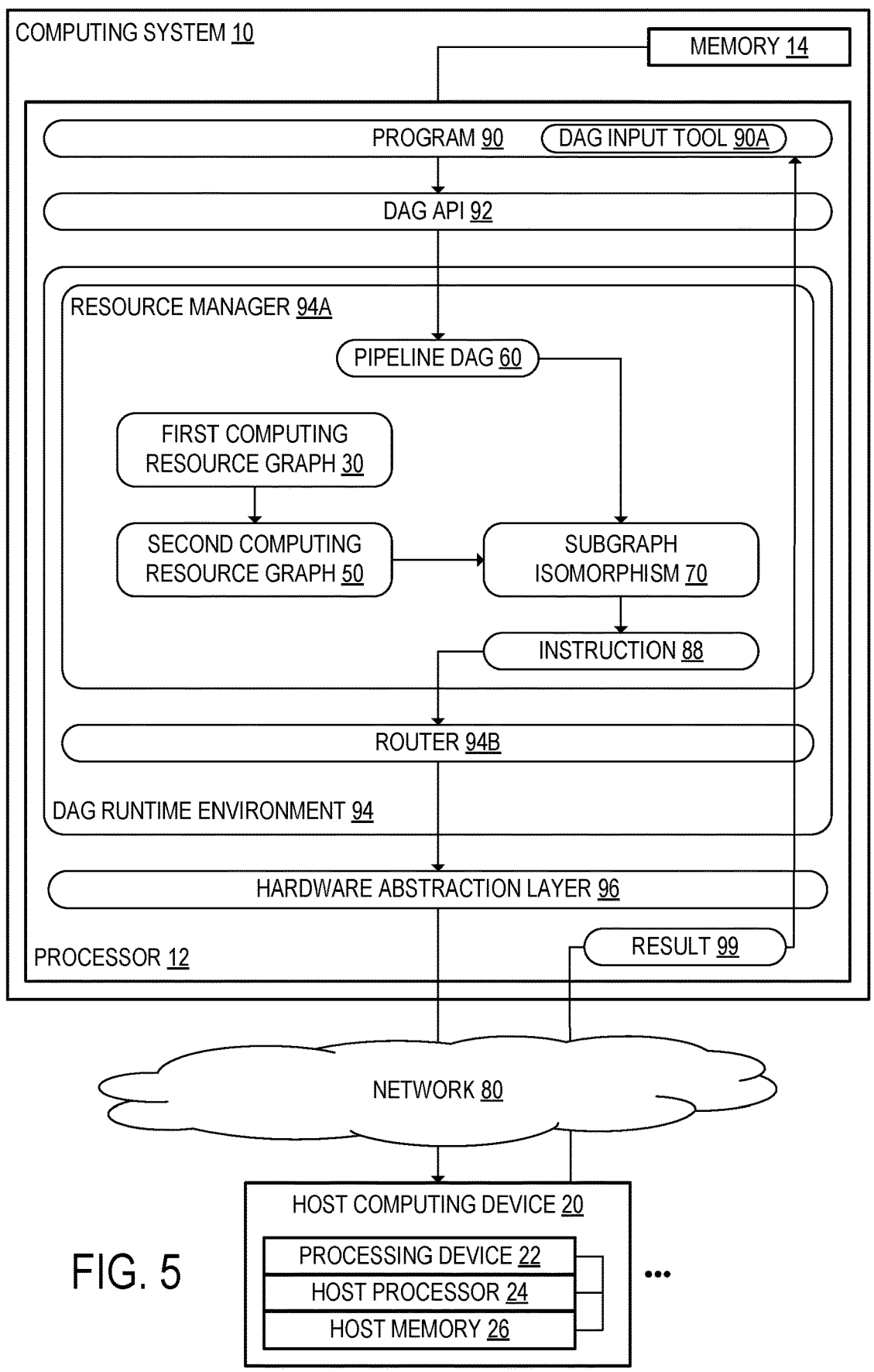
FIG. 5 shows the computing system and the host computing device when the processor of the computing system executes a DAG runtime environment, according to the embodiment of FIG. 1.

FIG. 5 shows the computing system 10 of FIG. 1 when the processor 12 is configured to execute a DAG runtime environment 94. The DAG runtime environment 94 may, for example, include a resource manager 94A at which the processor 12 is configured to generate the first computing resource graph 30, the second computing resource graph 50, and the subgraph isomorphism 70. The DAG runtime environment 94 may further include a router 94B configured to package the instructions 88 into packets with respective headers indicating the physical devices and functions 32 to which the instructions 88 are configured to be transmitted. The router 94B may, for example, include a routing table that indicates a respective address for each physical device and each function 32 included in the first computing resource graph 30.

Figure 6:
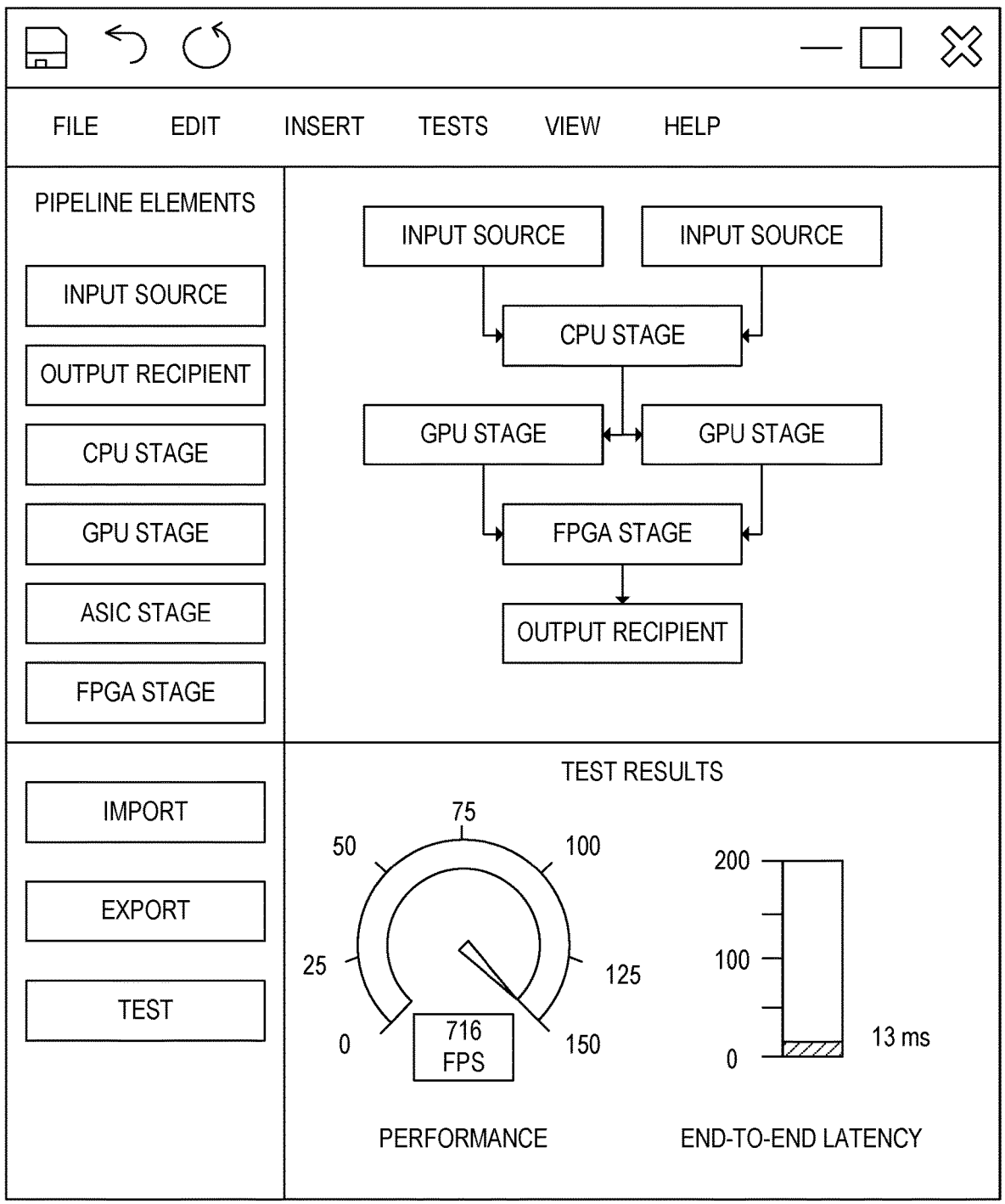
FIG. 6 shows an example graphical user interface (GUI) of a DAG input tool, according to the embodiment of FIG. 1.

At a program 90, a user such as a developer or administrator may utilize a DAG input tool 90A to author a DAG for consumption by a DAG application program interface (API) 92. According to one example, the DAG input tool 90A may include a graphical user interface (GUI) 91 at which a graphical representation of the pipeline DAG 60 may be displayed. FIG. 6 shows an example GUI 91 for the DAG input tool 90A. At the GUI 91, the user may add, remove, and edit the one or more input sources 61, processing stages 62, and output recipients 63 of the pipeline DAG 60. The GUI 91 may further include an option to import a pipeline DAG 60 into the DAG input tool 90A. For example, the pipeline DAG 60 may be imported from a file system location at which the pipeline DAG 60 is locally or remotely stored. In addition, at the GUI 91, the user may export the pipeline DAG 60 to a file as a serialized data structure. This serialized data structure may be taken as input by the DAG API 92. The GUI 91 may further include an option to test the performance of the pipeline DAG 60 and view test results. In the example of FIG. 6, the test results include a number of frames of video processed per second. In addition, the test results include an end-to-end latency of the DAG pipeline 60.

At the DAG runtime environment 94, the processor 12 may be configured to receive the pipeline DAG 60 from the program 90 via the DAG API 92. The program 90 may, for example, be a software development kit (SDK) at which a user may define the pipeline DAG 60. The DAG API 92 may be configured to convert the pipeline DAG 60 defined at the program 90 into a form that is usable by the resource manager 94A.

After the instructions 88 are generated, the processor 12 may be further configured to convey the instructions 88 to execute the plurality of processing stages 62 from the DAG runtime environment 94 to the plurality of processing devices 22 via a hardware abstraction layer 96. The hardware abstraction layer 96 may be executed by the processor 12 in examples in which the plurality of processing devices 22 may have a respective plurality of device libraries that specify the functions 32 that may be executed on the processing devices 22. The hardware abstraction layer 96 may be configured to multiplex the device libraries of the processing devices 22 such that the DAG runtime environment 94 may communicate with the processing devices 22 over a uniform interface. Following completion of processing, the result 99 may be communicated from the host computing device 20 to the computing system 10, by passing the result 99 through the hardware abstraction layer 96, router 94B, resource manager 94A, and DAG API 92, to the program 90. The result may take one of the forms described above, such as an acknowledgement of completion of processing, analytic data related to the processing, or a substantive result of the processing. An error code may also be returned as a result in case processing could not be completed for some reason at the host computing device 20.

Figure 7A:
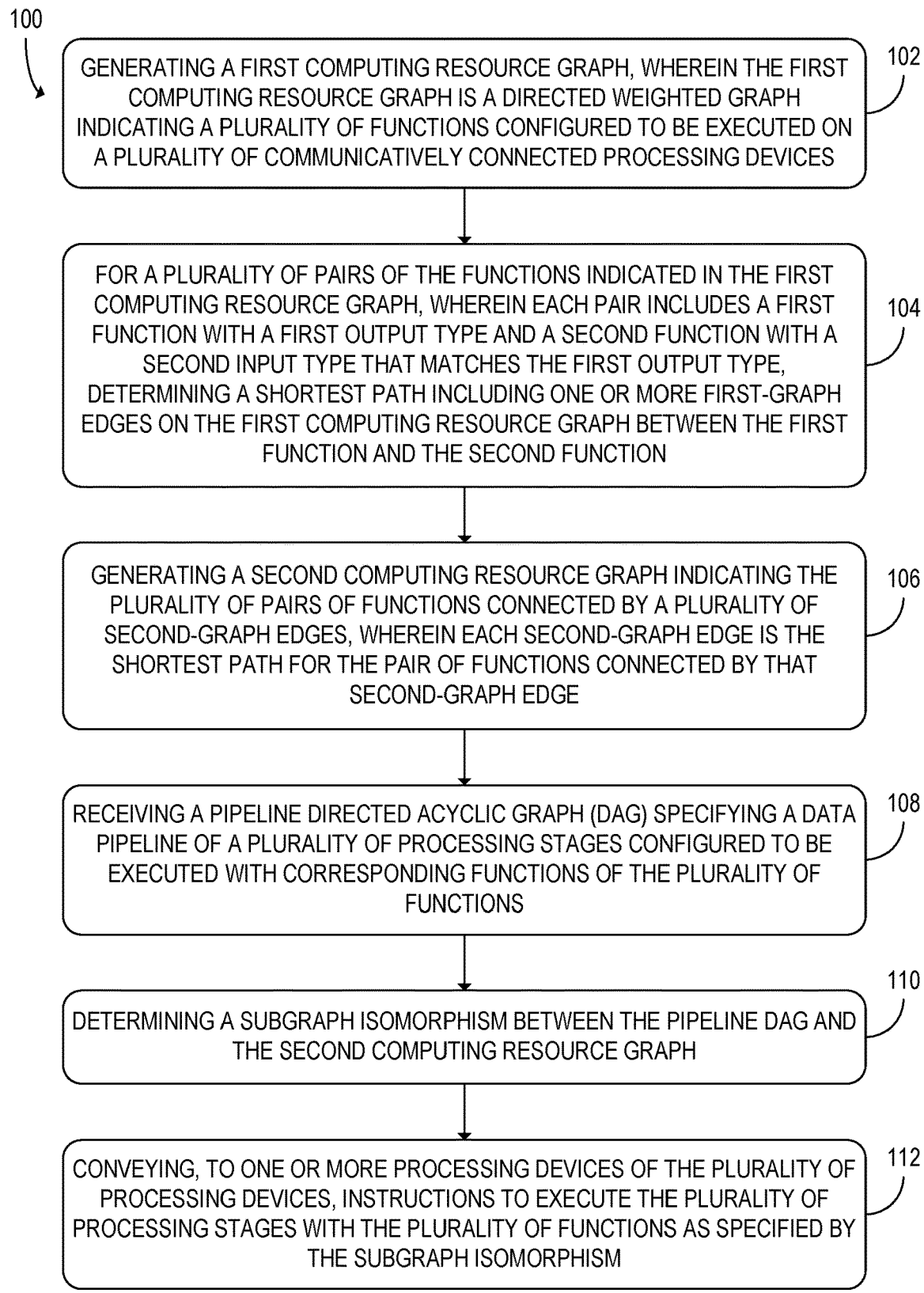
FIG. 7A shows a flowchart of an example method for use with a computing system, according to the embodiment of FIG. 1.

FIG. 7A shows a flowchart of an example method 100 for use with a computing system. The method 100 shown in FIG. 7A may be used with the computing system 10 of FIG. 1 or with some other computing system. At step 102, the method 100 may include generating a first computing resource graph. The first computing resource graph may be a directed weighted graph indicating a plurality of functions configured to be executed on a plurality of communicatively connected processing devices. For example, each processing device may be a central processing unit (CPU), a graphical processing unit (GPU), an application-specific integrated circuit (ASIC), or a field-programmable gate array (FPGA). In addition, the first computing resource graph may further indicate one or more physical devices that are directly or indirectly connected to the plurality of functions by the plurality of first-graph edges. Each physical device of the one or more physical devices may be a network, a host computing device, or a processing device of the one or more processing devices.

Figure 7B:
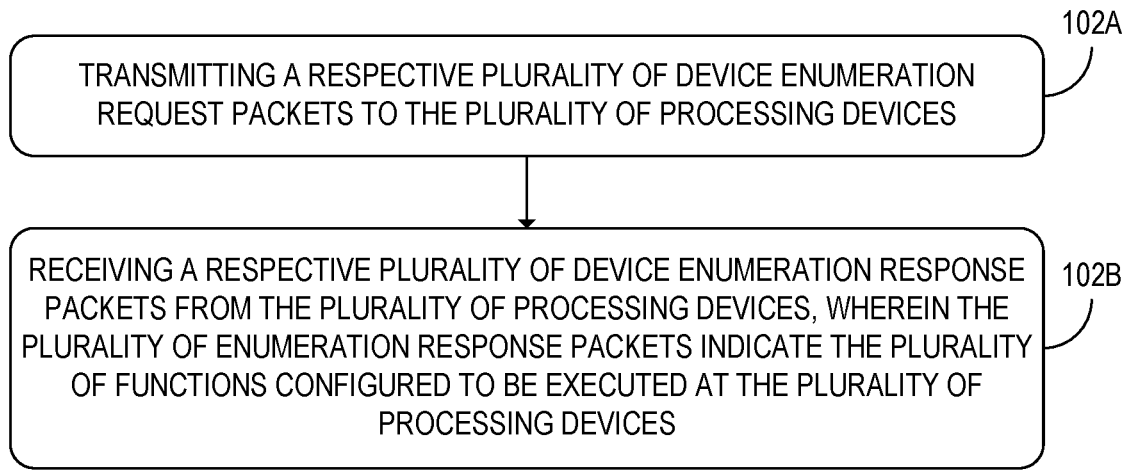
FIG. 7B shows additional steps of the method of FIG. 7A that may be performed when generating the first computing resource graph.

FIG. 7B shows additional steps that may be performed in some examples when the first computing resource graph is generated. At step 102A, the method 100 may further include transmitting a respective plurality of device enumeration request packets to the plurality of processing devices. At step 102B, the method 100 may further include receiving a respective plurality of device enumeration response packets from the plurality of processing devices. The plurality of enumeration response packets may indicate the plurality of functions configured to be executed at the plurality of processing devices. In addition, the plurality of enumeration response packets may indicate the plurality of physical devices included in the first computing resource graph. The first computing resource graph may then be constructed based on enumeration data included in the plurality of enumeration response packets.

Returning to FIG. 7A, the method 100 may further include, at step 104, determining a plurality of shortest paths for a plurality of pairs of the functions indicated in the first computing resource graph. Each pair may include a first function with a first output type and a second function with a second input type that matches the first output type. The shortest path may include one or more first-graph edges on the first computing resource graph between the first function and the second function. The shortest path may be a weighted shortest path with a total first-graph edge weight equal to a sum of the plurality of first-graph edge weights of the first-graph edges included in the shortest path.

At step 106, the method 100 may further include generating a second computing resource graph indicating the plurality of pairs of functions connected by a plurality of second-graph edges. Each second-graph edge may be the shortest path for the pair of functions connected by that second-graph edge. In addition, for each pair of functions connected by a respective second-graph edge as indicated in the second computing resource graph, the second-graph edge may have a second-graph edge weight equal to a total first-graph edge weight of the shortest path for the pair as indicated in the first computing resource graph. When a first function has a first output type that is incompatible with a second input type of the second function, the second computing resource graph may lack a second-graph edge pointing from the first function to the second function.

At step 108, the method 100 may further include receiving a pipeline DAG specifying a data pipeline of a plurality of processing stages configured to be executed with corresponding functions of the plurality of functions. In some examples, the pipeline DAG may be received at a runtime environment from a program via a DAG API. Each processing stage of the plurality of processing stages may have a respective processing stage input type and a respective processing stage output type specified in the pipeline DAG. The pipeline DAG may further specify one or more input sources and one or more output recipients for the data pipeline.

At step 110, the method 100 may further include determining a subgraph isomorphism between the pipeline DAG and the second computing resource graph. The subgraph isomorphism may include a plurality of third-graph edges with a plurality of third-graph edge weights that match the second-graph edge weights of the corresponding edges included in the second computing resource graph. In some examples, a plurality of valid subgraph isomorphisms may be identified between the pipeline DAG and the second computing resource graph. When the subgraph isomorphism is one of a plurality of subgraph isomorphisms, the subgraph isomorphism with a lowest total second-graph edge weight among the plurality of subgraph isomorphisms may be determined. That subgraph isomorphism may then be used in the subsequent steps discussed below.

At step 112, the method 100 may further include conveying, to one or more processing devices of the plurality of processing devices, instructions to execute the plurality of processing stages with the plurality of functions as specified by the subgraph isomorphism. The instructions may be conveyed to the one or more processing devices in a plurality of packets. When the pipeline DAG specifies respective input types and output types for the processing stages, then for each processing stage, the instructions to execute that processing stage may be conveyed to a processing device of the plurality of processing devices that is configured to execute a corresponding function with the processing stage input type and the processing stage output type of the processing stage. In some examples, the instructions may be conveyed to the one or more processing devices via a hardware abstraction layer, which may be configured to multiplex across a plurality of function libraries of the one or more processing devices.

Figure 7C:
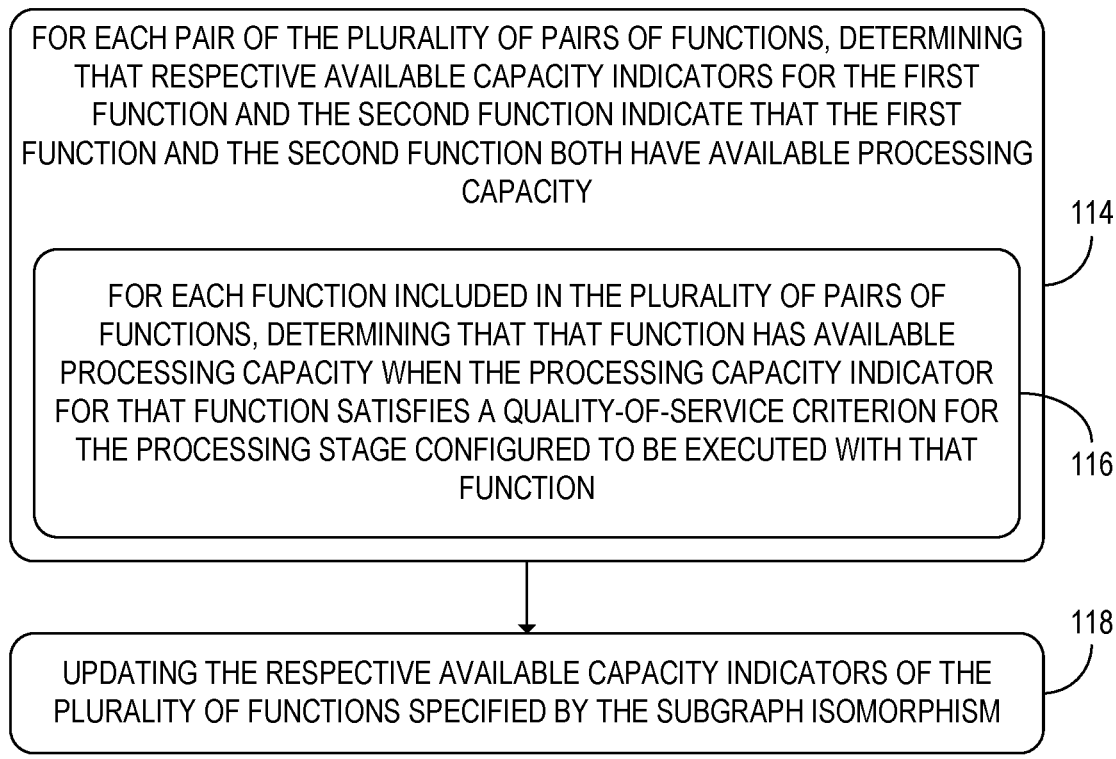
FIG. 7C shows additional steps of the method of FIG. 7A that may be performed when the plurality of functions included in the first computing resource graph have respective available capacity indicators.

FIG. 7C shows additional steps of the method 100 that may be performed in some examples. At step 114, the method 100 may further include, for each pair of the plurality of pairs of functions, determining that respective available capacity indicators for the first function and the second function indicate that the first function and the second function both have available processing capacity. For example, step 114 may be performed prior to determining the shortest path between a pair of functions.

At step 116, step 114 may include, for each function included in the plurality of pairs of functions, determining that that function has available processing capacity when the processing capacity indicator for that function satisfies a QoS criterion for the processing stage configured to be executed with that function. The QoS criterion for each processing stage may be specified in the pipeline DAG.

At step 118, the method 100 may further include updating the respective available capacity indicators of the plurality of functions specified by the subgraph isomorphism. The available capacity indicators of the plurality of functions may be updated to account for the use of those functions to instantiate the data pipeline. This update may be made subsequently to transmitting the instructions to the plurality of processing devices.

Using the systems and methods discussed above, an efficient routing path may be constructed for executing the processing stages of a data pipeline on a plurality of processing devices. Thus, the latency and cost associated with executing the processing stages included in the data pipeline may be reduced. With the above systems and methods, specialized hardware accelerators may be more easily utilized for tasks such as video analysis and machine learning.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
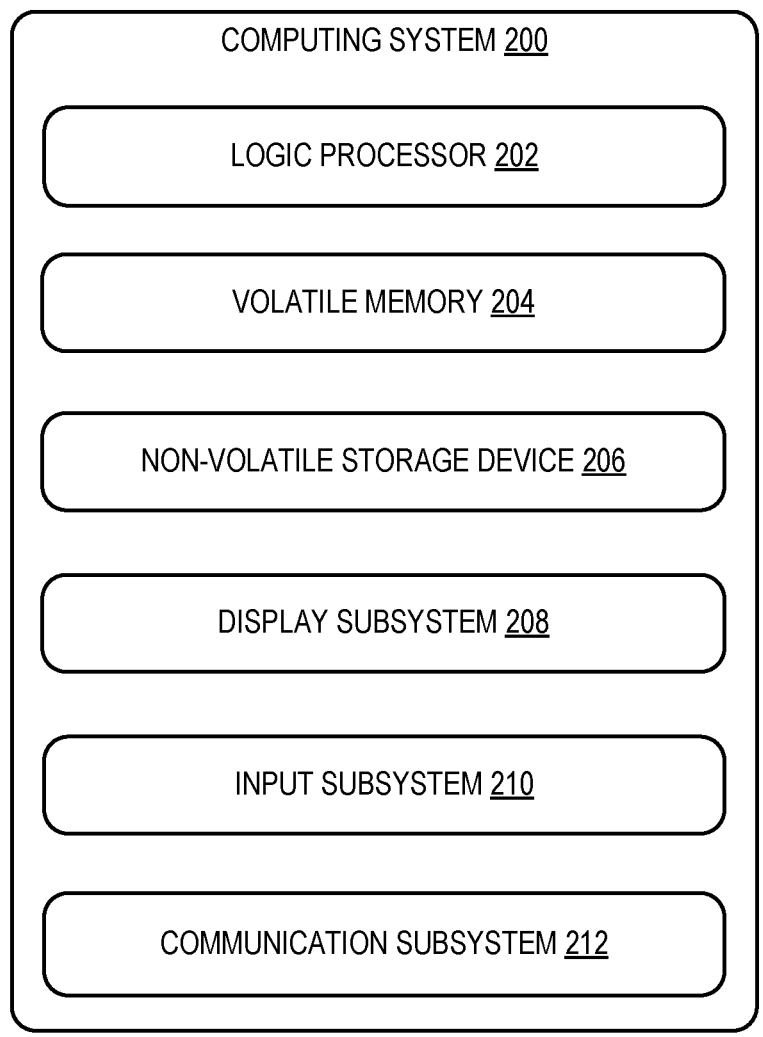
FIG. 8 shows a schematic view of an example computing environment in which the computing system of FIG. 1 may be enacted.

FIG. 8 schematically shows a non-limiting embodiment of a computing system 200 that can enact one or more of the methods and processes described above. Computing system 200 is shown in simplified form. Computing system 200 may embody the computing system 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 8.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a GUI. As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs describe several aspects of the present disclosure. According to one aspect of the present disclosure, a computing system is provided, including a processor configured to generate a first computing resource graph. The first computing resource graph may be a directed weighted graph indicating a plurality of functions configured to be executed on a plurality of communicatively connected processing devices. For a plurality of pairs of the functions indicated in the first computing resource graph, wherein each pair includes a first function with a first output type and a second function with a second input type that matches the first output type, the processor may be further configured to determine a shortest path including one or more first-graph edges on the first computing resource graph between the first function and the second function. The processor may be further configured to generate a second computing resource graph indicating the plurality of pairs of functions connected by a plurality of second-graph edges. Each second-graph edge is the shortest path for the pair of functions connected by that second-graph edge. The processor may be further configured to receive a pipeline directed acyclic graph (DAG) specifying a data pipeline of a plurality of processing stages configured to be executed with corresponding functions of the plurality of functions. The processor may be further configured to determine a subgraph isomorphism between the pipeline DAG and the second computing resource graph. The processor may be further configured to convey, to one or more processing devices of the plurality of processing devices, instructions to execute the plurality of processing stages with the plurality of functions as specified by the subgraph isomorphism.

According to this aspect, each processing stage of the plurality of processing stages may have a respective processing stage input type and a respective processing stage output type specified in the pipeline DAG. For each processing stage, the instructions to execute that processing stage may be conveyed to a processing device of the plurality of processing devices that is configured to execute a corresponding function with the processing stage input type and the processing stage output type of the processing stage.

According to this aspect, for each pair of functions connected by a respective second-graph edge as indicated in the second computing resource graph, the second-graph edge may have a second-graph edge weight equal to a total first-graph edge weight of the shortest path for the pair as indicated in the first computing resource graph.

According to this aspect, the subgraph isomorphism may be one of a plurality of subgraph isomorphisms between the pipeline DAG and the second computing resource graph. The subgraph isomorphism may have a lowest total second-graph edge weight among the plurality of subgraph isomorphisms.

According to this aspect, for each pair of the plurality of pairs of functions, the processor may be configured to determine the shortest path subsequently to determining that respective available capacity indicators for the first function and the second function indicate that the first function and the second function both have available processing capacity.

According to this aspect, the processor may be further configured to update the respective available capacity indicators of the plurality of functions specified by the subgraph isomorphism.

According to this aspect, the pipeline DAG may further specify a quality-of-service criterion for each processing stage of the plurality of processing stages. For each function included in the plurality of pairs of functions, the processor may be further configured to determine that that function has available processing capacity when the processing capacity indicator for that function satisfies the quality-of-service criterion for the processing stage configured to be executed with that function.

According to this aspect, the first computing resource graph may further indicate one or more physical devices that are directly or indirectly connected to the plurality of functions by the plurality of first-graph edges. Each physical device of the one or more physical devices may be a network, a host computing device, or a processing device of the one or more processing devices.

According to this aspect, the processor may be further configured to generate the first computing resource graph at least in part by transmitting a respective plurality of device enumeration request packets to the plurality of processing devices. The processor may be further configured to generate the first computing resource graph at least in part by receiving a respective plurality of device enumeration response packets from the plurality of processing devices. The plurality of enumeration response packets may indicate the plurality of functions configured to be executed at the plurality of processing devices.

According to this aspect, the processor may be further configured to generate the first computing resource graph at least in part by assigning first-graph edge weights to the first-graph edges based at least in part on, for each endpoint of each first-graph edge, whether that endpoint is a function, a processing device, a host computing device, or a network.

According to this aspect, each processing device may be a central processing unit (CPU), a graphical processing unit (GPU), an application-specific integrated circuit (ASIC), or a field-programmable gate array (FPGA).

According to this aspect, at a DAG runtime environment, the processor may be configured to receive the pipeline DAG from a program via a DAG application program interface (API). The processor may be configured to convey the instructions to execute the plurality of processing stages from the DAG runtime environment to the plurality of processing devices via a hardware abstraction layer.

According to another aspect of the present disclosure, a method for use with a computing system is provided. The method may include generating a first computing resource graph. The first computing resource graph may be a directed weighted graph indicating a plurality of functions configured to be executed on a plurality of communicatively connected processing devices. The method may further include, for a plurality of pairs of the functions indicated in the first computing resource graph, wherein each pair includes a first function with a first output type and a second function with a second input type that matches the first output type, determining a shortest path including one or more first-graph edges on the first computing resource graph between the first function and the second function. The method may further include generating a second computing resource graph indicating the plurality of pairs of functions connected by a plurality of second-graph edges. Each second-graph edge may be the shortest path for the pair of functions connected by that second-graph edge. The method may further include receiving a pipeline directed acyclic graph (DAG) specifying a data pipeline of a plurality of processing stages configured to be executed with corresponding functions of the plurality of functions. The method may further include determining a subgraph isomorphism between the pipeline DAG and the second computing resource graph. The method may further include conveying, to one or more processing devices of the plurality of processing devices, instructions to execute the plurality of processing stages with the plurality of functions as specified by the subgraph isomorphism.

According to this aspect, each processing stage of the plurality of processing stages may have a respective processing stage input type and a respective processing stage output type specified in the pipeline DAG. For each processing stage, the instructions to execute that processing stage may be conveyed to a processing device of the plurality of processing devices that is configured to execute a corresponding function with the processing stage input type and the processing stage output type of the processing stage.

According to this aspect, for each pair of functions connected by a respective second-graph edge as indicated in the second computing resource graph, the second-graph edge may have a second-graph edge weight equal to a total first-graph edge weight of the shortest path for the pair as indicated in the first computing resource graph.

According to this aspect, the subgraph isomorphism may be one of a plurality of subgraph isomorphisms between the pipeline DAG and the second computing resource graph. The subgraph isomorphism may have a lowest total second-graph edge weight among the plurality of subgraph isomorphisms.

According to this aspect, for each pair of the plurality of pairs of functions, the shortest path may be determined subsequently to determining that respective available capacity indicators for the first function and the second function indicate that the first function and the second function both have available processing capacity.

According to this aspect, the method may further include updating the respective available capacity indicators of the plurality of functions specified by the subgraph isomorphism.

According to this aspect, the first computing resource graph may further indicate one or more physical devices that are directly or indirectly connected to the plurality of functions by the plurality of first-graph edges. Each physical device of the one or more physical devices may be a network, a host computing device, or a processing device of the one or more processing devices.

According to another aspect of the present disclosure, a computing system is provided, including a processor configured to generate a first computing resource graph. The first computing resource graph may be a directed weighted graph indicating a plurality of functions configured to be executed on a plurality of communicatively connected processing devices. For a plurality of pairs of the functions indicated in the first computing resource graph, wherein each pair includes a first function and a second function that are indicated in the first computing resource graph as having available processing capacity, the processor may be further configured to determine a shortest path including one or more first-graph edges on the first computing resource graph between the first function and the second function. The processor may be further configured to generate a second computing resource graph indicating the plurality of pairs of functions connected by a plurality of second-graph edges. Each second-graph edge may be the shortest path for the pair of functions connected by that second-graph edge. The processor may be further configured to receive a pipeline directed acyclic graph (DAG) specifying a data pipeline of a plurality of processing stages. The processor may be further configured to determine a subgraph isomorphism between the pipeline DAG and the second computing resource graph configured to be executed with corresponding functions of the plurality of functions. The processor may be further configured to convey, to one or more processing devices of the plurality of processing devices, instructions to execute the plurality of processing stages with the plurality of functions as specified by the sub graph isomorphism.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
generate a first computing resource graph, wherein the first computing resource graph is a directed weighted graph indicating a plurality of functions configured to be executed on a plurality of communicatively connected processing devices;
for a plurality of pairs of the functions indicated in the first computing resource graph, wherein each pair includes a first function with a first output type and a second function with a second input type that matches the first output type, determine a shortest path including one or more first-graph edges on the first computing resource graph between the first function and the second function;
generate a second computing resource graph indicating the plurality of pairs of functions connected by a plurality of second-graph edges, wherein each second-graph edge is the shortest path for the pair of functions connected by that second-graph edge;
receive a pipeline directed acyclic graph (DAG) specifying a data pipeline of a plurality of processing stages configured to be executed with corresponding functions of the plurality of functions;
determine a subgraph isomorphism between the pipeline DAG and the second computing resource graph; and
convey, to one or more processing devices of the plurality of processing devices, instructions to execute the plurality of processing stages with the plurality of functions as specified by the subgraph isomorphism.

2. The computing system of claim 1, wherein:
each processing stage of the plurality of processing stages has a respective processing stage input type and a respective processing stage output type specified in the pipeline DAG; and
for each processing stage, the instructions to execute that processing stage are conveyed to a processing device of the plurality of processing devices that is configured to execute a corresponding function with the processing stage input type and the processing stage output type of the processing stage.

3. The computing system of claim 1, wherein, for each pair of functions connected by a respective second-graph edge as indicated in the second computing resource graph, the second-graph edge has a second-graph edge weight equal to a total first-graph edge weight of the shortest path for the pair as indicated in the first computing resource graph.

4. The computing system of claim 3, wherein:
the subgraph isomorphism is one of a plurality of subgraph isomorphisms between the pipeline DAG and the second computing resource graph; and
the subgraph isomorphism has a lowest total second-graph edge weight among the plurality of subgraph isomorphisms.

5. The computing system of claim 1, wherein, for each pair of the plurality of pairs of functions, the processor is configured to determine the shortest path subsequently to determining that respective available capacity indicators for the first function and the second function indicate that the first function and the second function both have available processing capacity.

6. The computing system of claim 5, wherein the processor is further configured to update the respective available capacity indicators of the plurality of functions specified by the subgraph isomorphism.

7. The computing system of claim 5, wherein:
the pipeline DAG further specifies a quality-of-service criterion for each processing stage of the plurality of processing stages; and
for each function included in the plurality of pairs of functions, the processor is further configured to determine that that function has available processing capacity when the processing capacity indicator for that function satisfies the quality-of-service criterion for the processing stage configured to be executed with that function.

8. The computing system of claim 1, wherein:
the first computing resource graph further indicates one or more physical devices that are directly or indirectly connected to the plurality of functions by the plurality of first-graph edges; and each physical device of the one or more physical devices is a network, a host computing device, or a processing device of the one or more processing devices.

9. The computing system of claim 8, wherein the processor is further configured to generate the first computing resource graph at least in part by:
transmitting a respective plurality of device enumeration request packets to the plurality of processing devices; and
receiving a respective plurality of device enumeration response packets from the plurality of processing devices, wherein the plurality of enumeration response packets indicate the plurality of functions configured to be executed at the plurality of processing devices.

10. The computing system of claim 8, wherein the processor is further configured to generate the first computing resource graph at least in part by assigning first-graph edge weights to the first-graph edges based at least in part on, for each endpoint of each first-graph edge, whether that endpoint is a function, a processing device, a host computing device, or a network.

11. The computing system of claim 1, wherein each processing device is a central processing unit (CPU), a graphical processing unit (GPU), an application-specific integrated circuit (ASIC), or a field-programmable gate array (FPGA).

12. The computing system of claim 1, wherein:
at a DAG runtime environment, the processor is configured to receive the pipeline DAG from a program via a DAG application program interface (API); and
the processor is configured to convey the instructions to execute the plurality of processing stages from the DAG runtime environment to the plurality of processing devices via a hardware abstraction layer.

13. A method for use with a computing system, the method comprising:
generating a first computing resource graph, wherein the first computing resource graph is a directed weighted graph indicating a plurality of functions configured to be executed on a plurality of communicatively connected processing devices;
for a plurality of pairs of the functions indicated in the first computing resource graph, wherein each pair includes a first function with a first output type and a second function with a second input type that matches the first output type, determining a shortest path including one or more first-graph edges on the first computing resource graph between the first function and the second function;
generating a second computing resource graph indicating the plurality of pairs of functions connected by a plurality of second-graph edges, wherein each second-graph edge is the shortest path for the pair of functions connected by that second-graph edge;
receiving a pipeline directed acyclic graph (DAG) specifying a data pipeline of a plurality of processing stages configured to be executed with corresponding functions of the plurality of functions;
determining a subgraph isomorphism between the pipeline DAG and the second computing resource graph; and
conveying, to one or more processing devices of the plurality of processing devices, instructions to execute the plurality of processing stages with the plurality of functions as specified by the subgraph isomorphism.

14. The method of claim 13, wherein:
each processing stage of the plurality of processing stages has a respective processing stage input type and a respective processing stage output type specified in the pipeline DAG; and
for each processing stage, the instructions to execute that processing stage are conveyed to a processing device of the plurality of processing devices that is configured to execute a corresponding function with the processing stage input type and the processing stage output type of the processing stage.

15. The method of claim 13, wherein, for each pair of functions connected by a respective second-graph edge as indicated in the second computing resource graph, the second-graph edge has a second-graph edge weight equal to a total first-graph edge weight of the shortest path for the pair as indicated in the first computing resource graph.

16. The method of claim 15, wherein:
the subgraph isomorphism is one of a plurality of subgraph isomorphisms between the pipeline DAG and the second computing resource graph; and
the subgraph isomorphism has a lowest total second-graph edge weight among the plurality of subgraph isomorphisms.

17. The method of claim 13, wherein, for each pair of the plurality of pairs of functions, the shortest path is determined subsequently to determining that respective available capacity indicators for the first function and the second function indicate that the first function and the second function both have available processing capacity.

18. The method of claim 17, further comprising updating the respective available capacity indicators of the plurality of functions specified by the sub graph isomorphism.

19. The method of claim 13, wherein:
the first computing resource graph further indicates one or more physical devices that are directly or indirectly connected to the plurality of functions by the plurality of first-graph edges; and
each physical device of the one or more physical devices is a network, a host computing device, or a processing device of the one or more processing devices.

20. A computing system comprising:
a processor configured to:
generate a first computing resource graph, wherein the first computing resource graph is a directed weighted graph indicating a plurality of functions configured to be executed on a plurality of communicatively connected processing devices;
for a plurality of pairs of the functions indicated in the first computing resource graph, wherein each pair includes a first function and a second function that are indicated in the first computing resource graph as having available processing capacity, determine a shortest path including one or more first-graph edges on the first computing resource graph between the first function and the second function;
generate a second computing resource graph indicating the plurality of pairs of functions connected by a plurality of second-graph edges, wherein each second-graph edge is the shortest path for the pair of functions connected by that second-graph edge;
receive a pipeline directed acyclic graph (DAG) specifying a data pipeline of a plurality of processing stages;
determine a subgraph isomorphism between the pipeline DAG and the second computing resource graph configured to be executed with corresponding functions of the plurality of functions; and convey, to one or more processing devices of the plurality of processing devices, instructions to execute the plurality of processing stages with the plurality of functions as specified by the subgraph isomorphism.

\* \* \* \* \*